United States Patent
Skrabala et al.

(10) Patent No.: US 11,273,420 B2
(45) Date of Patent: Mar. 15, 2022

(54) EXTRUDER SCREW, EXTRUSION DEVICE HAVING AN EXTRUDER SCREW AND METHOD FOR PLASTICIZING A PLASTIC

(71) Applicant: KRAUSSMAFFEI EXTRUSION GMBH, Hannover (DE)

(72) Inventors: Otto Skrabala, Tengen (DE); Stephan Roider, Unterhaching (DE)

(73) Assignee: KRAUSSMAFFEI EXTRUSION GMBH, Hannover (DE)

( * ) Notice: Subject to any disclaimer, the term of this patent is extended or adjusted under 35 U.S.C. 154(b) by 0 days.

(21) Appl. No.: 17/292,100

(22) PCT Filed: Nov. 7, 2019

(86) PCT No.: PCT/EP2019/080469
§ 371 (c)(1),
(2) Date: May 7, 2021

(87) PCT Pub. No.: WO2020/108939
PCT Pub. Date: Jun. 4, 2020

(65) Prior Publication Data
US 2021/0402358 A1    Dec. 30, 2021

(30) Foreign Application Priority Data
Nov. 27, 2018   (DE) .................. 10 2018 009 308.6

(51) Int. Cl.
*B01F 7/08*        (2006.01)
*B01F 7/00*        (2006.01)
(Continued)

(52) U.S. Cl.
CPC .......... *B01F 7/088* (2013.01); *B01F 7/00416* (2013.01); *B01F 2215/0049* (2013.01);
(Continued)

(58) Field of Classification Search
CPC .................. B01F 7/088; B01F 7/00416; B01F 2215/0049; B29C 48/395; B29C 48/505; B29C 48/53
See application file for complete search history.

(56) References Cited

U.S. PATENT DOCUMENTS 4,015,832 A *  4/1977  Kruder .................... B29C 48/67
                                                      366/76.1
4,173,417 A *  11/1979 Kruder .................... B29C 48/65
                                                      366/89
(Continued)

FOREIGN PATENT DOCUMENTS

DE    102012008023 A1   10/2013
EP      1993807 B1      11/2008

OTHER PUBLICATIONS

International Search Report for PCT/EP2019/080469 dated Jan. 20, 2020.
(Continued)

*Primary Examiner* — Tony G Soohoo
(74) *Attorney, Agent, or Firm* — Pearne & Gordon LLP

(57) ABSTRACT

An extruder screw for plasticizing at least one plastic or plastic mixture, including a melting zone, a shaft zone and a mixing zone arranged between the melting zone and the shaft zone, wherein a conveying flight is formed in the melting zone and in the shaft zone, which extends helically along a longitudinal axis of the screw, wherein a conveying flight of the melting zone ends at an end of the melting zone towards the mixing zone and a conveying flight of the shaft zone begins at an end towards the mixing zone. A flight depth of the melting zone continuously decreases along the longitudinal axis of the screw to the mixing zone. Further, an extrusion device having the extruder screw and to a method for plasticizing at least one plastic or plastic mixture.

11 Claims, 3 Drawing Sheets

(51) Int. Cl.
 B29C 48/505 (2019.01)
 B29C 48/395 (2019.01)
 B29C 48/53 (2019.01)

(52) U.S. Cl.
 CPC .......... *B29C 48/395* (2019.02); *B29C 48/505* (2019.02); *B29C 48/53* (2019.02)

(56) References Cited

U.S. PATENT DOCUMENTS

| | | | | |
|---|---|---|---|---|
| 4,405,239 A * | 9/1983 | Chung | .................... | B29C 48/65 366/89 |
| 5,219,590 A * | 6/1993 | Kruder | .................... | B29C 48/65 425/208 |
| 6,056,430 A * | 5/2000 | Medici, Jr. | .............. | B29C 48/53 366/88 |
| 6,227,692 B1 * | 5/2001 | Heathe | ................. | B29C 48/395 366/81 |
| 6,599,004 B2 * | 7/2003 | Barr | ........................ | B29C 48/52 366/88 |
| 6,672,753 B1 * | 1/2004 | Womer | ................... | B29C 48/65 366/88 |
| 7,014,353 B2 * | 3/2006 | Womer | ................. | B29C 48/605 366/88 |
| 7,156,550 B2 * | 1/2007 | Womer | ................... | B29C 48/65 366/88 |
| 2004/0141406 A1 * | 7/2004 | Womer | ................... | B29C 48/53 366/88 |
| 2015/0085597 A1 * | 3/2015 | Schneider | ............... | B29C 48/56 366/88 |

OTHER PUBLICATIONS

Written Opinion for PCT/EP2019/080469 dated Jan. 20, 2020.
International Preliminary Report on Patentability fro PCT/EP2019/080469 dated Oct. 27, 2020.
English translation of International Search Report for PCT/EP2019/080469, dated May 7, 2021.

* cited by examiner

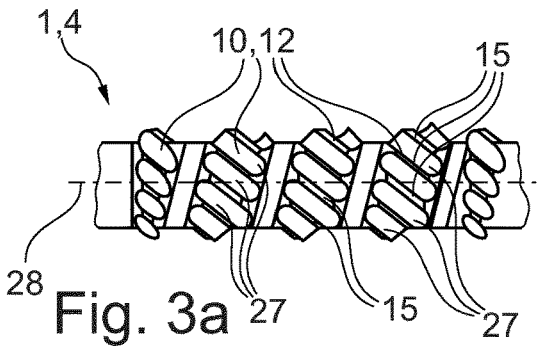
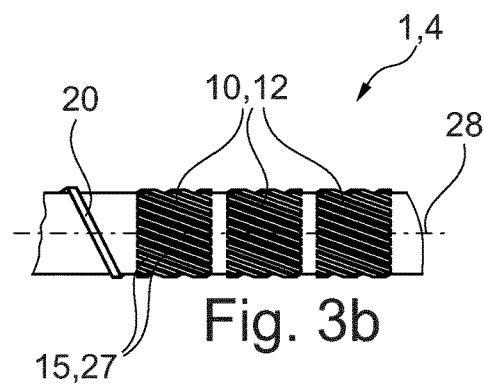
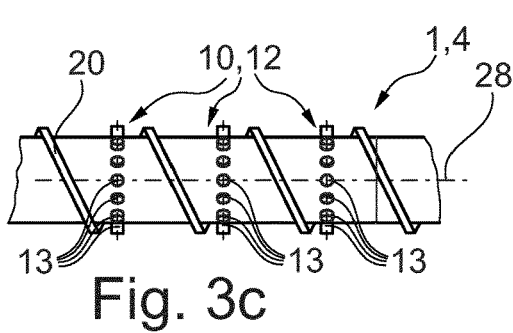
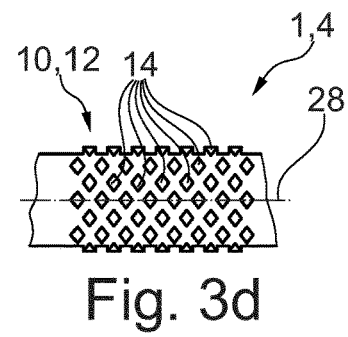
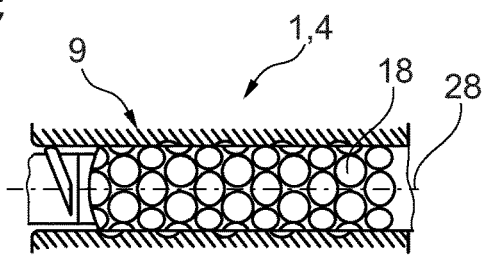
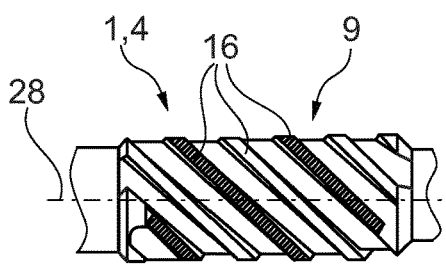
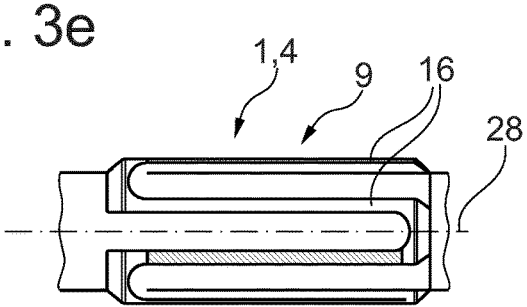
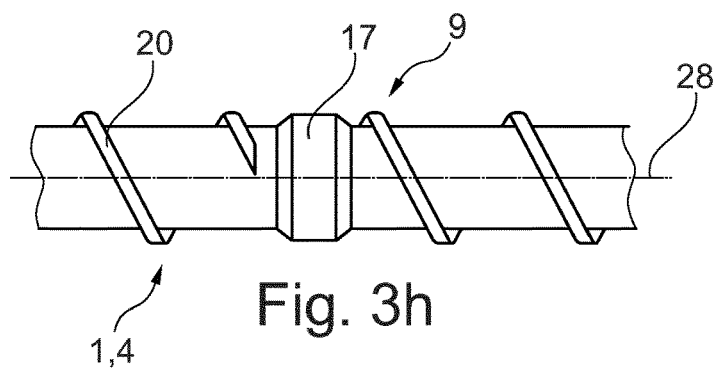

EXTRUDER SCREW, EXTRUSION DEVICE HAVING AN EXTRUDER SCREW AND METHOD FOR PLASTICIZING A PLASTIC

CROSS-REFERENCE TO RELATED APPLICATIONS

This is a National Stage application of PCT international application PCT/EP2019/080469, filed on Nov. 7, 2019 which claims the priority of German Patent Application No. 10 2018 009 308.6, filed Nov. 27, 2018, both of which are incorporated herein by reference in their entirety.

FIELD OF THE INVENTION

The invention relates to an extruder screw for plasticizing at least one plastic or a plastic mixture, comprising a melting zone, a wave zone (also designated as wave-zone and therefore concerning a zone which has at least one conveying channel changing its depth in a wave-shaped manner in longitudinal direction), and a mixing zone arranged between the melting zone and the wave zone, wherein in the melting zone and in the wave zone a conveying flight is formed extending helically/with the formation of a helix along a longitudinal axis of the screw. The invention relates furthermore to an extrusion device having said extruder screw and a method for plasticizing at least one plastic or a plastic mixture by means of the extrusion device.

BACKGROUND OF THE INVENTION

Numerous generic screw configurations are already known from the prior art.

With U.S. Pat. No. 4,173,417 A a wave screw is described, in which a compression zone (with conventional melting) directly adjoins a wave zone. Similar screws are also known from U.S. Pat. Nos. 4,405,239 A and 6,599,004 B2, in which a wave zone directly adjoins a compression zone. These screws have the disadvantage that the residual solid material of the plastic or plastic mixture, which is compacted to the solid bed, enters as a relatively large lump into the wave zone. Thereby it can occur that the wave zone only plasticizes with a relatively low efficiency.

Therefore, there were already considerations to remodel corresponding screws in order to increase the efficiency of the wave zone. In this context, U.S. Pat. No. 6,056,430 A discloses a screw in which melting is carried out initially conventionally with a barrier screw, wherein a wave zone is placed in a metering zone of the screw. The flights of the barrier section extend there into the wave zone. Between the barrier zone and the wave zone a transition zone is placed, in which the function of the two flights is reversed. The barrier flight therefore becomes the main flight and the main flight becomes the barrier flight. Thereby, it is achieved that the solid bed, which is initially situated on the passive flank, is displaced to the active flank of the screw. Through the displacement, a higher shear is to be built up onto the solid bed. However, an intermixing between the solid and a melt of the corresponding plastic is not to take place here.

In addition, it is known from U.S. Pat. No. 6,672,753 B1 to combine a barrier zone with a wave zone of a screw, wherein a so-called reorientation zone is placed between these. Reorientation zones are also known from U.S. Pat. No. 7,014,353 B2 and U.S. Pat. No. 7,156,550 B2, wherein a barrier zone is always placed before the reorientation zone. A disadvantage of the screws which are provided with the respective reorientation zones can, however, likewise be seen in that in some cases a sufficiently high degree of intermixing of the residual solid with the melt is still not present before the entry into the wave zone.

Prior art is known additionally from EP 1 993 807 B1, by which it is disclosed to combine a multiple-threaded screw with a wave zone, wherein the wave zone is arranged behind the respective multiple-threaded melting region. However, the higher pitch in the mixing zone compared to the zones adjoining the mixing zone is to be named here as a disadvantage. Thereby, a relatively great space requirement, or respectively a reduction in efficiency with the same installation space, is the result.

Furthermore, from U.S. Pat. No. 6,227,692 B1 an extruder screw is known wherein a wave zone is placed at the end of the melting zone. Adjoining this wave zone a mixing zone follows, and in turn, adjoining the latter, a second wave zone. Through the mixing zone, an intermixing of melt and residual solid is achieved. However, it is to be named as a disadvantage here that the mixing zone is only placed after the first wave zone. Thus, the residual solid enters into the first wave zone in an unmixed manner, wherein the residual solid is still uncomminuted, whereby the first wave zone plasticizes inefficiently.

Further prior art is known from US 2004/0141 406 A1.

BRIEF SUMMARY OF THE INVENTION

It is therefore the object of the present invention to remedy the disadvantages known from the prior art and in particular to make available an extruder screw which enables a more efficient plasticizing of the respective plastic or plastic mixture.

This is solved according to the idea in accordance with the invention in that a (first) conveying flight of the melting zone ends at an end of the melting zone facing the mixing zone arranged in direct connection to the melting zone, and a (second) conveying flight of the wave zone begins at an end facing the mixing zone. The conveying flight of the extruder screw is thus omitted/interrupted in the region of the mixing zone. The (first) conveying flight of the melting zone then ends directly at the start of the mixing zone. The mixing zone consequently has no conveying flight. A conveying flight designates in particular the helically-running flight of the extruder screw which serves for the conveying of the plastic in axial direction along the longitudinal axis of the screw. Consequently, the mixing zone in particular has no helically-running conveying flight which has/forms one or more pitch/pitches extending completely/around 360°.

Through the omitting of the conveying flight in the mixing zone, there results a significantly better blending of the solid component/residual solid with the melt before entry into the wave zone. Thereby, plasticizing can take place significantly more effectively in the subsequent wave zone.

In addition, a further increase to the mixing effect is achieved in that the melting zone is configured as a decompression screw. The channel depth of the conveying channel(s) of the melting zone increases here in sections continuously in axial direction along the longitudinal axis of the screw. The channel depth of the melting zone increases completely (i.e. completely over the entire axial length of the melting zone) continuously in axial direction along the longitudinal axis of the screw. Through the increase of the channel depth, the residual solid at the end of the melting zone is washed out and thus the residual solid is already broken up. Through this breaking up of the residual solid, a blending of the solid component/residual solid with the melt can already take place in the melting zone. Through the further increased intermixing, the wave zone adjoining the mixing zone can plasticize more distinctly effectively.

Further advantageous embodiments with regard to the idea according to the invention are claimed by the subclaims and are explained more closely below.

Accordingly, it is furthermore advantageous when the wave zone is arranged in direct connection to the mixing zone. The (second) conveying flight of the wave zone then ends or begins directly at the end of the mixing zone.

Alternatively to the immediate/direct transition of the melting zone into the mixing zone it is, however, also advantageous if between the melting zone and the mixing zone a further zone, preferably a (e.g. multiple-threaded, preferably two-threaded) metering zone is present, which in turn differs from the melting zone and the mixing zone. Thereby, the efficiency for plasticizing is further increased.

Furthermore, in this connection it is advantageous if the melting zone is multiple-threaded, preferably at least two-threaded, further preferably three-threaded. Here, further preferably, any flight/all flights of the melting zone end(s) at the end of the melting zone facing the mixing zone.

It is also expedient if the wave zone is multiple-threaded, preferably two-threaded. Here, in turn, preferably any flight/all flights of the wave zone begin(s) only at the end of the wave zone facing the mixing zone.

In order to further improve the comminution of the residual solid entering into the mixing zone, it is also advantageous if the mixing zone has at least one (distributive and/or disperse) mixing section promoting a distributive and/or disperse blending of a solid component with a plasticized component/melt component of the at least one plastic or plastic mixture.

In this context, it is particularly advantageous if the at least one mixing section is configured materially in one piece/integrally with a screw section forming the mixing zone, or separately/individually with respect to the screw section forming the mixing zone (with the formation of a separate mixing element or separate mixing elements). Thereby, numerous possibilities exist in order to adapt the corresponding mixing zone individually to the plastic which is to be plasticized.

In this respect, it is furthermore advantageous if the at least one mixing section is configured as a toothed disk, a perforated disk, a mixing pin or a rhombic element or has one or more elongated/strip-shaped elevation(s). Thereby in particular the distributive blending in the mixing zone is increased.

In order to promote the disperse blending, it is additionally advantageous if the at least one mixing section is configured as a shear gap, a blister ring or a wedge gap element/wedge gap region.

The intermixing is further improved if the mixing zone has several of these mixing sections, promoting the distributive and/or disperse blending of the solid component with the plasticized component of the plastic.

Furthermore, the invention relates to an extrusion device/an extruder having an extruder screw according to the invention in accordance with one of the previously described embodiments, i.e. with an extruder screw in accordance with the idea according to the invention.

Furthermore, the invention relates to a method for plasticizing at least one plastic or a plastic mixture by means of the extrusion device/the extruder.

In other words, through the embodiment according to the invention, a better distribution and fragmentation of the solid component and a more intensive intermixing with the melt is achieved, which in turn promotes the melting process in the wave zone. Thereby, in the wave zone with unchanged geometric dimensions more residual solid is melted. The throughputs can be further increased, without having to increase the overall size of the machine. A throughput increase has, furthermore, a positive effect on the operating costs and on the investment costs, because with smaller machines the desired output is already achieved. In addition, it is expected that the combination of conventional melting and disperse melting (in the wave zone) enables a throughput increase without seriously increasing the exit temperature of the melt. This, in turn, has a positive effect on the operating costs and on the manufacturing costs of the respective extruded products.

BRIEF DESCRIPTION OF THE DRAWINGS

The invention is now explained more closely below with the aid of figures, in which context various example embodiments are presented to illustrate the ideas according to the invention.

There are shown.

DESCRIPTION OF EXAMPLE EMBODIMENTS

The figures are only schematic in nature and serve exclusively for an understanding of the invention. The identical elements are provided with the same reference numbers. It is also pointed out that the various features of the different figures and example embodiments can in principle be combined with one another.

Figure 1:
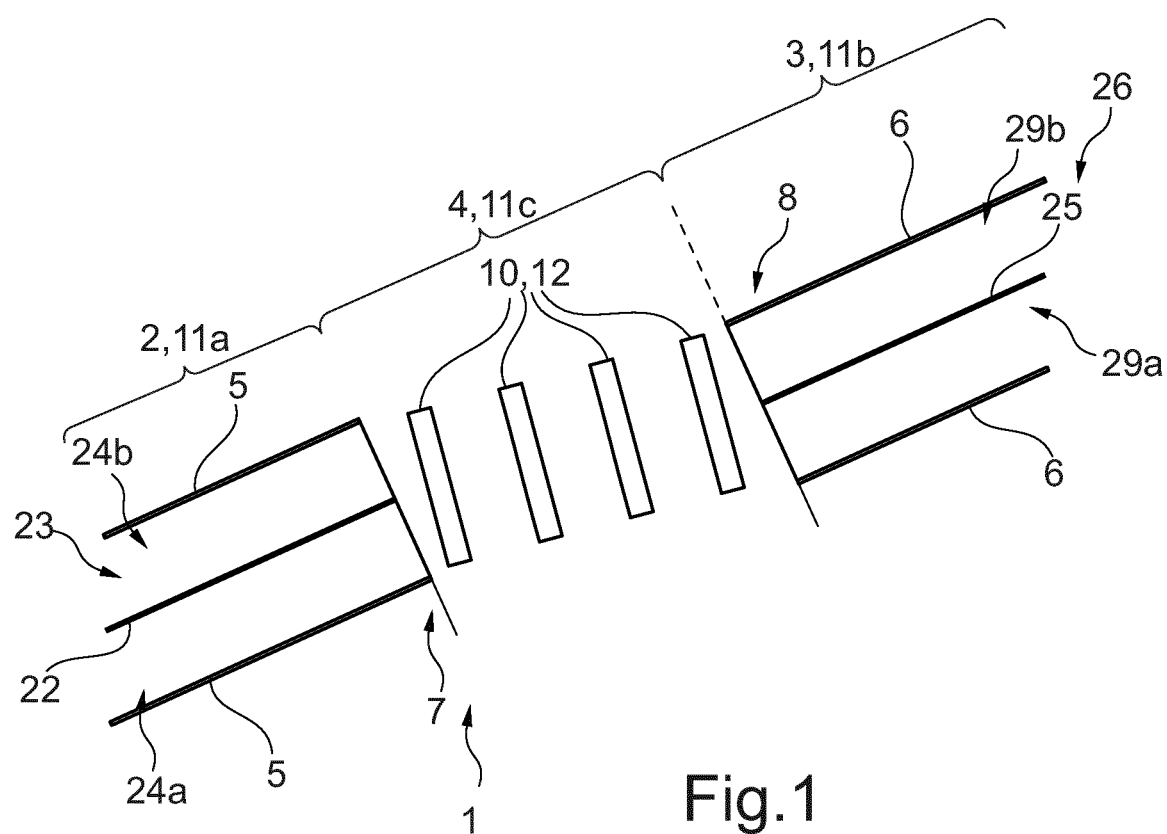
FIG. 1 a schematic view of a portion of an extruder screw according to the invention in accordance with a first example embodiment, wherein the extruder screw is illustrated flattened and in a lying position, wherein the melting zone is configured as a decompression zone, FIG. 2 a detailed perspective illustration of a mixing zone used in FIG. 1 with mixing sections, FIGS. 3a to 3h further example embodiments with respect to the mixing sections able to be used in FIG. 1.

In connection with FIG. 1, an example embodiment is shown which illustrates the idea according to the invention. The embodiments of the mixing sections 9, 10, as they are illustrated in FIGS. 2 and 3a to 3h are able to be applied in principle to the example embodiment of FIG. 1. The example embodiment of FIG. 1 illustrates the extruder screw 1 according to the invention in a schematic angled presentation. The extruder screw 1 serves in the usual manner for plasticizing at least one plastic/plastic component or a plastic mixture in the form of several plastic components. The extruder screw 1 is used in the usual manner in its operation in an extrusion device/extruder, which extrusion device is not illustrated further here for the sake of clarity. The extrusion device has, in a typical manner, a housing/extrusion housing with an inlet and an outlet. The extruder screw 1 extends with its zones 2, 3, 4, which are described more closely below, between the inlet and the outlet, and is rotatably arranged radially within a cylindrical wall of the housing. By means of this extruder screw 1, in operation of the extrusion device according to a production method an extrusion component/extruded component is manufactured, wherein the at least one plastic is fed to the inlet in solid form, is plasticized through the extruder screw 1 and finally at the outlet is ejected for the formation of the extrusion component. For the plasticizing, the at least one plastic passes through the zones 2, 3 and 4 of the extruder screw 1 which are described more closely below.

In FIG. 1 it can be seen that the three zones 2, 3 and 4 are configured in the form of a melting zone 2, a mixing zone 4 and a wave zone 3. The mixing zone 4 adjoins downstream/in extrusion direction directly/immediately on to the melting zone 2. The wave zone 3 adjoins downstream directly/immediately on to the mixing zone 4. The melting zone 2 is formed at a first screw section 11a of the extruder screw 1; the wave zone 3 is formed at a second screw section 11b of the extruder screw 1; the mixing zone 4 is formed at a third screw section 11c of the extruder screw 1. The three screw sections 11a, 11b, 11c adjoin in axial direction of the extruder screw 1 therefore directly onto one another/continue directly into one another.

In further embodiments, a further zone, for instance a metering zone, can also be arranged in addition between the melting zone 2 and the mixing zone 4. Also between the mixing zone 4 and the wave zone 3 in principle a further zone can be arranged. Respectively two zones 2, 3, 4 immediately adjoining one another along an imaginary screw longitudinal axis of the extruder screw 1 differ from one another in particular with regard to the configuration (flight pitch) or respectively the presence of a conveying flight 5, 6.

Both the melting zone 2 and also the wave zone 3 have respectively at least one conveying flight 5, 6. In the melting zone 2 the conveying flight is designated as first conveying flight 5. In the wave zone 3 the conveying flight is designated as second conveying flight 6. The respective first and second conveying flight 5, 6 forms a main conveying flight. Each of the first and second conveying flights 5, 6 extends helically/in a helical-shaped manner/in a spiral-shaped manner along the imaginary longitudinal axis of the screw. The first conveying flight 5 and the second conveying flight 6 thus respectively form a screw thread on a radial outer side of the extruder screw 1.

In a further embodiment, the melting zone 2 is configured to be only single-threaded. In further embodiments, the melting zone 2 is configured to be at least two-threaded, namely three-threaded. In this first example embodiment, however, it is configured to be two-threaded. The melting zone 2 thus has an intermediate conveying flight 22 in addition to the first conveying flight 5. To illustrate a (first) conveying channel 23 formed in the melting zone 2, the first conveying flight 5 is illustrated twice. The intermediate conveying flight 22 extends parallel to the first helically extending conveying flight 5, along the imaginary longitudinal axis of the screw. The intermediate conveying flight 22 is arranged in axial direction (along the imaginary longitudinal axis of the screw) of the extruder screw 1 between two screw/thread channels of the first conveying flight 5. The (first) conveying channel 23 formed by the first conveying flight 5 is divided by the intermediate conveying flight 22 into two partial conveying channels 24a and 24b. The first conveying flight 5 and the intermediate conveying flight 22, viewed in radial direction (with respect to the longitudinal axis of the screw) have the same height.

In FIG. 1 the melting zone 2 is embodied in the form of a decompression zone. The channel depth (depth of the conveying channel 23/of the first and second partial conveying channels 24a and 24b) of the melting zone 2 increases along the longitudinal axis of the screw towards the mixing zone 4/downstream continuously/linearly. The channel depth of the melting zone 2 can therefore increase at least partially, in sections or completely along the longitudinal axis of the screw towards the mixing zone 4. Here it is also possible to leave the channel depth in the melting zone 2/decompression zone identical along the longitudinal axis of the screw partially, in sections or completely.

In the example embodiment according to FIG. 1, it is pointed out that the wave zone 3 is configured as a conventional disperse plasticizing/melting zone. In a further embodiment, the wave zone 3 can be configured to be only single-threaded, however in this example embodiment it is configured to be two-threaded. The wave zone 3 is also equipped with a (second) intermediate conveying flight 25, which in turn is arranged between two threads of the (second) conveying flight 6 of the wave zone 3 which follow one another axially. The second intermediate conveying flight 25 extends parallel to the helically extending second conveying flight 6, along the imaginary longitudinal axis of the screw. The second intermediate conveying flight 25 divides a second conveying channel 26, formed by the second conveying flight 6, in turn into a first partial conveying channel 29a and a second partial conveying channel 29b. The wave zone 3 is configured as a wave-zone and therefore has a channel depth changing in a wave-shaped manner along the (second) conveying channel 26 of the wave zone 3.

In a further embodiment, the radial height of the second intermediate conveying flight 25 is smaller than the radial height of the second conveying flight 6, so that a shear gap occurs at the second intermediate flight. In a further embodiment, the second conveying flight 6 and the second intermediate conveying flight change their radial height in sections along the second conveying channel 26, wherein the second conveying flight 6 and the second intermediate conveying flight 25 change their function alternately and serve in sections as conveying flight and as shear flight.

The mixing zone 4 is arranged axially (with respect to the longitudinal axis of the screw) between the melting zone 2 and the wave zone 3. In the example embodiment of FIG. 1, the mixing zone 4 has no conveying flight. The first conveying flight 5 therefore ends at an end 7 of the melting zone 2 facing the mixing zone 4. The intermediate conveying flight 22 also ends at the end 7 of the melting zone 2 facing the mixing zone 4. In addition, the second conveying flight 6 begins in turn only at an end/start 8 of the wave zone 3 facing the mixing zone 4. The intermediate conveying flight 25 also begins only at the end 8 of the wave zone 3 facing the mixing zone 4. Therefore in this embodiment the mixing zone 4 is embodied in a flight-free manner. The mixing zone 4 therefore has no elongated elevations/flights which extend helically around at least one thread/around at least 360°.

In FIG. 1 it can be seen furthermore that in the mixing zone 4, several mixing sections 9, 10 are present, which are only indicated schematically here, wherein these mixing sections 9, 10 in principle, as described below with reference to FIGS. 2 and 3a to 3h, can be configured differently.

Figure 2:
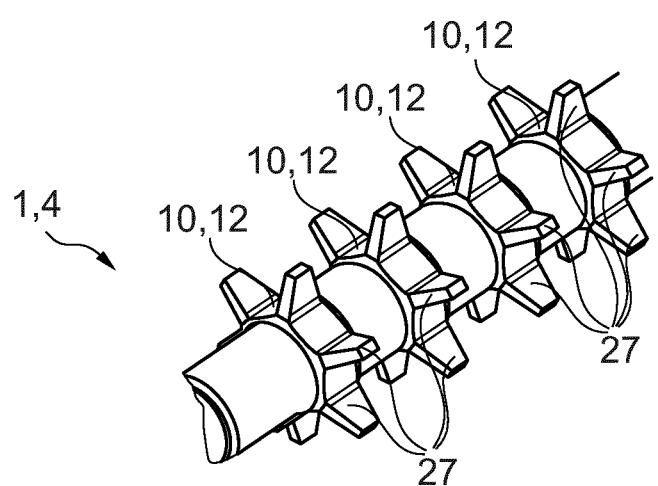

FIG. 2 shows a mixing zone 4 of the first example embodiment, in which several distributive mixing sections 10 are arranged. These distributive mixing sections 10 are embodied as separate mixing elements and are mounted non-rotatably on the extruder screw 1 in the region of the mixing zone 4. The (four) distributive mixing sections 10 are arranged spaced apart and adjacent to one another in axial direction of the longitudinal axis of the screw. The distributive mixing sections 10 are respectively configured as a toothed disk 12/toothed ring. The respective toothed disk 12 is thus provided with a ring-shaped base body on which several teeth 27 (spaced apart from one another in a circumferential direction), forming an outer toothing (straight toothing) are arranged.

In connection with FIGS. 3a to 3h, it can be seen that these mixing sections 9, 10 can, however, also be embodied in principle differently. The distributive mixing sections 10, as explained more closely below, can in principle also be replaced by disperse mixing sections 9, or can be provided additionally to these.

Compared to FIG. 2, it can be seen in FIG. 3a that the distributive mixing sections 10 essentially also can be configured directly/materially in one piece with the (third) screw section 11c of the extruder screw 1 forming the mixing zone 4. Each mixing section 10 is configured as an oblique toothing. The oblique toothing is thus formed by several strip-shaped integral elevations 15 arranged adjacent to one another in circumferential direction on the outer circumferential side of the extruder screw 1 in the mixing zone 4. The respective elevation 15 forms, in turn, a tooth 27.

Whereas in FIG. 3a the formed oblique toothing is embodied as involute toothing, it is also possible according to FIG. 3b not to embody the toothing as involute toothing. However, the distributive mixing sections 10 in turn have elevations 15 running parallel to one another. With regard to the elevations 15, it is pointed out that these extend by a limited angular range around the outer circumferential side of the extruder screw 1 and respectively do not form a flight extending through 360° to a complete thread.

In connection with FIG. 3c it is indicated that the distributive mixing sections 10 can also have several mixing pins 13 distributed in circumferential direction. In this example embodiment, the mixing pins are, in turn, embodied materially in one piece directly with the third screw section 11c. In principle it is also sufficient to equip the mixing section 10 with only one mixing pin 13.

In connection with FIG. 3d, the distributive mixing section 10 is embodied as a group of rhombic elements 14/rhomboid elevations 15 distributed in axial direction and in circumferential direction. The rhombic elements 14 are also formed materially in one piece on the outer circumferential side of the extruder screw 1.

In connection with FIGS. 3e to 3h it can be seen that the distributive mixing sections 10 are able to be replaced by disperse mixing sections 9. In FIG. 3e the disperse mixing section 9 is configured as a blister ring region/a blister ring 18 in the mixing zone 4. This blister ring region 18 has several circular indentations/recesses distributed in circumferential direction and in axial direction of the extruder screw 1.

In FIGS. 3f and 3g further possible disperse mixing sections 9 in the form of shear gaps 16 are illustrated. In FIG. 3f several shear gaps 16 are arranged running obliquely on the outer circumferential side of the extruder screw 1. In FIG. 3g a meander-shaped shear gap 16 is illustrated.

In FIG. 3h the disperse mixing section 9 is embodied as a ring-shaped wedge gap region 17/wedge gap element.

The various mixing sections 9 and 10, as illustrated in FIGS. 3a to 3h, are known in principle from U.S. Pat. No. 6,136,246 A, for which reason the further embodiments named herein for these mixing sections are deemed to be integrated herein.

Instead of the use of the toothed disk 12, in principle it is also possible to configure the distributive mixing section 10 as a perforated disk/pierced disk. The perforated disk is preferably formed as a disk having several through-holes distributed in circumferential direction and running axially, and is fastened to the extruder screw 1 in the same manner as the toothed disks 12.

In principle it is also pointed out that in further example embodiments the various mixing sections, i.e. the disperse and distributive mixing sections 9, 10 can be freely combined with one another, both as separate elements and also as a one-piece/integral element.

In operation of the extrusion device according to the invention, the solid bed is comminuted to as small a particle size as possible before the entry into the wave-zone (wave zone 3), in order to increase the melting performance. Between the melting part of the screw 1 in the form of the melting zone 2, which is configured as a decompression zone, which can have a single-threaded or multiple-threaded embodiment, and the wave zone 3, a mixing zone 4 is placed, which achieves a more intensive as possible fragmentation and distribution of the solid bed and as good an intermixing as possible between solid and melt. Distributive and/or disperse mixing elements (mixing sections) 9, 10 are deliberately used. Distributive mixing elements 10 can be, inter alia, toothed disks 12, perforated disks, mixing pins 13 and/or rhombic elements 14. In this case, shear gaps 16a, 16b, blister rings 18 and/or wedge gap elements 17 are suitable as disperse mixing elements 9. Through the use of distributive and disperse mixing elements 9, 10, a distinctly more intensive intermixing is achieved in the mixing zone 4 and a more intensive distribution and fragmentation of the solid bed. In addition, the embodiment of the melting zone 2 as a decompression zone assists a washing out of the solid bed and thus, in turn, as more intensive a fragmentation and distribution of the solid bed as possible and as good an intermixing as possible between solid and melt.

Thereby, the particle size of the residual solid, which is transferred into the wave zone 3, is distinctly reduced, for which reason the wave zone 3 plasticizes more efficiently and thus also a higher plasticizing performance is achieved. In addition to the mixing elements 9, 10, preferably any flights can be removed in the mixing zone 4, in order to enable a free flow of the melt or respectively a free blending of the melt and of the solid. Through the free flow, the efficiency of the mixing elements 9, 10 is further increased, because transverse flows occur, which bring about an additional intermixing and redistribution.

LIST OF REFERENCE NUMBERS 1 extruder screw
2 melting zone
3 wave zone
4 mixing zone
5 first conveying flight
6 second conveying flight
7 end of the melting zone
8 end of the wave zone
9 disperse mixing section
10 distributive mixing section
11a first screw section
11b second screw section
11c third screw section
12 toothed disk
13 mixing pin
14 rhombic element
15 elevation
16a first shear gap
16b second shear gap
17 wedge gap region
18 blister ring region
19 barrier flight
20 third conveying flight 21 aperture
22 intermediate conveying flight first intermediate conveying flight
23 first conveying channel
24a first partial conveying channel
24b second partial conveying channel
25 second intermediate conveying flight
26 second conveying channel
27 tooth
28 longitudinal axis of the screw
29a first partial conveying channel
29b second partial conveying channel

What is claimed is:

1. An extruder screw (1) for plasticizing at least one plastic or a plastic mixture, comprising a melting zone (2), a wave zone (3) having at least one conveying channel changing its depth in a wave-shaped manner in longitudinal direction, and a mixing zone (4) arranged between the melting zone (2) and the wave zone (3) in direct connection to the melting zone (2), wherein in the melting zone (2) and in the wave zone (3) a conveying flight (5, 6) is arranged, extending helically along a longitudinal axis of the screw, wherein a conveying flight (5) of the melting zone (2) ends at an end (7) of the melting zone (2) facing the mixing zone (4), and a conveying flight (6) of the wave zone (3) begins at an end (8) facing the mixing zone (4), and wherein a channel depth of the melting zone (2) increases continuously along the longitudinal axis of the screw towards the mixing zone (4).

2. The extruder screw (1) according to claim 1, wherein the wave zone (3) is arranged in direct connection to the mixing zone (4).

3. The extruder screw (1) according to claim 1, wherein the melting zone (2) is multiple-threaded.

4. The extruder screw (1) according to claim 1, wherein the wave zone (3) is multiple-threaded.

5. The extruder screw (1) according to claim 1, wherein the melting zone (2) is configured at least partially as a decompression zone.

6. The extruder screw (1) according to claim 1, wherein the mixing zone (4) has at least one mixing section (9, 10) promoting a distributive and/or disperse blending of a solid component with a plasticized component of the at least one plastic or plastic mixture.

7. The extruder screw (1) according to claim 6, wherein the at least one mixing section (9, 10) is configured materially in one piece with a screw section (11c) forming the mixing zone (4), or separately to the screw section (11c) forming the mixing zone (4).

8. The extruder screw (1) according to claim 6, wherein the at least one mixing section (10) is configured as a toothed disk (12), a perforated disk, a mixing pin (13), or a rhombic element (14) or has a strip-shaped elevation (15).

9. The extruder screw (1) according to claim 6, wherein the at least one mixing section (9) is configured as a shear gap (16a, 16b), a blister ring (18) or a wedge gap region (17).

10. An extrusion device having the extruder screw (1) according to claim 1.

11. A method for plasticizing at least one plastic or a plastic mixture by means of the extrusion device according to claim 10.

* * * * *

UNITED STATES PATENT AND TRADEMARK OFFICE
CERTIFICATE OF CORRECTION

PATENT NO. : 11,273,420 B2
APPLICATION NO. : 17/292100
DATED : March 15, 2022
INVENTOR(S) : Otto Skrabala and Stephan Roider It is certified that error appears in the above-identified patent and that said Letters Patent is hereby corrected as shown below:

In the Specification

Column 7, Line 31:
"mixing pins are, in" should be "mixing pins 13 are, in"

Signed and Sealed this
Twentieth Day of December, 2022

Katherine Kelly Vidal
Director of the United States Patent and Trademark Office